United States Patent [19]

Imai et al.

[11] Patent Number: 5,315,699
[45] Date of Patent: May 24, 1994

[54] FILTERING OPERATION METHOD FOR VERY HIGH-SPEED IMAGE PROCESSING SYSTEM

[75] Inventors: Masaharu Imai; Kunio Honsawa, both of Toyohashi; Jota Tomita, Tokyo, all of Japan

[73] Assignee: Research Development Corporation of Japan, Tokyo, Japan

[21] Appl. No.: 851,024

[22] Filed: Mar. 11, 1992

[30] Foreign Application Priority Data

Mar. 20, 1991 [JP] Japan .................................. 3-57117
Mar. 20, 1991 [JP] Japan .................................. 3-57118

[51] Int. Cl.$^5$ ............................................. G06F 15/20
[52] U.S. Cl. ..................................... 395/162; 395/163; 395/166; 345/189
[58] Field of Search ............................... 395/162–166, 395/275; 340/798–799; 358/22; 345/189, 190, 200, 203; 364/724.05, 724.01

[56] References Cited

U.S. PATENT DOCUMENTS 5,191,647 3/1993 Masaki ................................. 395/162

*Primary Examiner*—Dale M. Shaw
*Assistant Examiner*—Kee M. Tung
*Attorney, Agent, or Firm*—Armstrong, Westerman, Hattori, McLeland & Naughton

[57] ABSTRACT

A filtering system for very high-speed image processing performs such image processing in parallel for each unit sequentially in each line. The filtering system includes an input unit having input elements for taking up all or a part of image data of each line in the order of raster scan, a processing unit having processing elements for performing image processing computation in parallel for each pixel as image data from each input element is transferred simultaneously, an output unit having output elements where processing data from each processing element is simultaneously transferred, and a controller for controlling the input unit, the processing unit, and the output unit. Each processing element includes an endless memory having memory capacity for storing as much data as required of a row in charge of processing and has a terminal address connected to a top address, a base pointer for writing the top address next to the terminal address such that each content is changed for each line by a command from the controller, and a reference pointer for writing the content of the base pointer for each line and for specifying an address of the memory by changing each content of the data read from the endless memory. By this arrangement, a region of the endless memory corresponding to a mask size of the filter is sequentially accessed by the reference pointer.

2 Claims, 7 Drawing Sheets

| $X_{i-1,j-1}$ | $X_{i,j-1}$ | $X_{i+1,j-1}$ |
|---|---|---|
| $X_{i-1,j}$ | $X_{i,j}$ | $X_{i+1,j}$ |
| $X_{i-1,j+1}$ | $X_{i,j+1}$ | $X_{i+1,j+1}$ |

FIG. 6(a)

| a | d | a |
|---|---|---|
| b | e | b |
| c | f | c |

FIG. 6(b)

| | | | |
|---|---|---|---|
| $PE_{i-1}$ | | $dX_{i-1,j-1}$ + $eX_{i-1,j}$ + $fX_{i-1,j+1}$ | $aX_{i-1,j-1}$ + $bX_{i-1,j}$ + $cX_{i-1,j+1}$ |
| $PE_i$ | | $dX_{i,j-1}$ + $eX_{i,j}$ + $fX_{i,j+1}$ | $aX_{i,j-1}$ + $bX_{i,j}$ + $cX_{i,j+1}$ |
| $PE_{i+1}$ | | $dX_{i+1,j-1}$ + $eX_{i+1,j}$ + $fX_{i+1,j+1}$ | $aX_{i+1,j-1}$ + $bX_{i+1,j}$ + $cX_{i+1,j+1}$ |

FILTERING OPERATION METHOD FOR VERY HIGH-SPEED IMAGE PROCESSING SYSTEM

BACKGROUND OF THE INVENTION

The present invention relates to a filtering operation method of a very high-speed image processing system RIPE (real-time image processing engine) for performing large-scale pre-processing of an image in real time.

There are now increasing demands on an image processing using computers in the fields of medical electronics, industrial production, etc. The primary, aim of the development in these applications in the near future is to achieve real-time processing of 2-dimensional or multi-dimensional large-scale images (high quality image). To improve recognizing ability of the system, it is essential to increase resolution of the image itself. For this purpose, it is necessary to increase the number of pixels and to enlarge mask size of the filter in pre-processing.

Actual requirements on image processing for the next several years would be:

(1) Multi-valued and color image having more than 2048×2048 pixels per image which can be processed.

(2) Local parallel processing such as filtering can be accomplished at high speed for the above image.

(3) Filtering operation can be achieved using a mask of 50×50 size.

In the image processing, pre-processing such as filtering is often performed. As the scales of image and filter become larger, calculation time required for pre-processing rapidly increases.

In the image processing system applied practically in medical electronics and industrial applications, processing is primarily performed for an image having about 512×512 pixels. For the pre-processing of an image with complicated density such as X-ray film for medical use with resolution of 2048×2048 pixels, real-time processing is practically difficult to perform even when a general-purpose large computer such as supercomputer is used. In order to actualize a special-purpose system for efficient pre-processing of such large-scale image, it seems to be essential to perform processing in parallel and in pipeline. In particular, most of the algorithms for filtering operation frequently use parallel type multiplication and addition, and it appears that spatial parallel processing for each pixel is effective.

To store data in so-called line parallel local computation where parallel processing for each pixel is performed by preparing as many computing elements as the pixels in a line of an image, a memory of finite length having linear address has been used in the past. However, when it is attempted to execute line parallel local computation by a program using such memory, it is necessary to sequentially change (move) the storage site of original data and intermediate results in memory. One of the effective methods is to move a base pointer of the storage site of original data and intermediate results in memory. When this method is used, it is necessary to make access to the original data and the intermediate results always through the base pointer. For this purpose, the memory must be accessed twice, i.e. it is essential to change the content of the base pointer and to read the content of the memory specified by the base pointer. Also, much time is required because of overhead for processing to operate the pointer at memory boundary.

In the filtering operation of line parallel local computation for performing parallel processing for each pixel by preparing as many computation elements as the pixels in a line of an image, each processing element performs computation on pixel data of a row, for which it is in charge of processing, and receives pixel data of the other rows. This data is multiplied by weight of a filter and processings are performed such as addition. Thus, the numbers of transfers, the number of multiplications and additions between the rows are increased. Especially, when mask size of the filter is increased, much time is required for filtering operation.

SUMMARY OF THE INVENTION

The present invention is to solve the above problems.

It is an object of the present invention to provide a method for filtering operation of a very high-speed image processing system.

It is another object of the present invention to extensively shorten the time for filtering operation.

It is still another object of the invention to actualize memory access by hardware configuration.

It is yet another object of the present invention to extensively reduce the number of data transfers between rows, the number of multiplications and the number of additions in line parallel local computation.

A very high-speed image processing system for performing image processing in parallel for each unit sequentially in each line according to the present invention comprises an input unit having a plurality of input elements for taking up all or a part of image data of each line in the order of raster scan, a processing unit having a plurality of processing elements for performing image processing computation in parallel for each pixel as image data from each input element is transferred simultaneously, an output unit having a plurality of output elements where processing data from each processing element is simultaneously transferred, and a controller for controlling the input unit, the processing unit and the output unit, and it is characterized in that there are provided in each processing element an endless memory having memory capacity for storing as much data as required of a row in charge of processing and having a terminal address connected to a top address, a base pointer for writing the top address next to the terminal address whereby each content is changed for each line by a command from said controller, and a reference pointer for writing the content of the base pointer for each line and for specifying address of said memory by changing each content of the data read from the endless memory, whereby a region of the endless memory corresponding to mask size of the filter is sequentially accessed by the reference pointer.

The present invention provides an image processing system by line parallel local computation for parallel processing for each pixel by preparing computation elements as many as or less than the pixels in a line of an image, whereby a terminal address is connected to a top address, and an endless memory of finite length (hereinafter referred as "slit memory") capable of storing as many data as required of a row in charge of processing is addressed by a base pointer and a reference pointer. Each time the line to be processed changes, the content of each base pointer is changed by an external controller, and it is reset to the top address 0 next to the terminal address. At the same time, the content of the base pointer is written on the reference pointer. The address of the slit memory is specified by the reference pointer, and the content of the reference pointer is changed once at the same time. A region of the slit memory corresponding to mask size of the filter is sequentially accessed by the reference pointer. Accordingly, it is possible to perform processing at very high speed with each processing element not being aware of which line is currently being processed.

Also, the very high-speed image processing system according to the present invention is to perform image processing by weighted filter having left-to-right symmetry locally and in parallel for each pixel sequentially in each line, and it comprises an input unit having a plurality of input elements for taking up all or a part of image data in a line in the order of raster scan, a processing unit having a plurality of processing elements for performing image processing computation in parallel for each pixel whereby image data is transferred simultaneously from each input element, an output unit having a plurality of output elements where processing data from each processing element is simultaneously transferred, and a controller for controlling the input unit, the processing unit and the output unit, and it is characterized in that each processing element multiplies each pixel data of the row, for which it is in charge of processing, by weight of each row at the center of filter, the results of multiplication are added together and maintained, each pixel data of the row in charge of processing are multiplied by weight of other rows on one side of the row at the center of the filter, the results of multiplication are added together and maintained, and each processing element executes filtering operation by receiving the transferred data maintained by the processing elements of the other rows.

According to the present invention, the image processing system uses a filter having left-to-right symmetry by line parallel local computation for performing parallel processing for each pixel by preparing processing elements as many as or less than the pixels in a line of the image. Each processing element multiplies pixel data of a row, for which it is in charge of processing, by weight of the row at the center of the filter, and the results are added. The pixel data of the row in charge of processing are multiplied by weight of the other rows on one side from the row at the center of the filter and the results are added. Each processing element receives the results of computation maintained by the processing elements of the other rows by transfer and executes filtering operation. Thus, it is possible to perform processing at very high speed by extensively reducing the number of multiplications, the number of additions and the number of transfers in filtering operation.

DESCRIPTION OF THE PREFERRED EMBODIMENT

First, description will be given on a very high-speed image processing system RIPE of the present invention referring to FIG. 2 and FIG. 3.

By a RIPE according to the present invention, the processing of each line corresponding to variable density image data of 65536 gradations (16 bits) is divided into three stages of input, computation and output. By pipeline processing, input/output of image data and computation are carried out in parallel. In the computation stage, as many PEs (processing elements) as the pixels in a line of an image are used. The same instruction is given to each PE by an external controller, and the same processing is performed to each image data. By this parallel processing of SIMD (single instruction multiple data stream) type, the image data can be processed simultaneously for each line.

Figure 2:
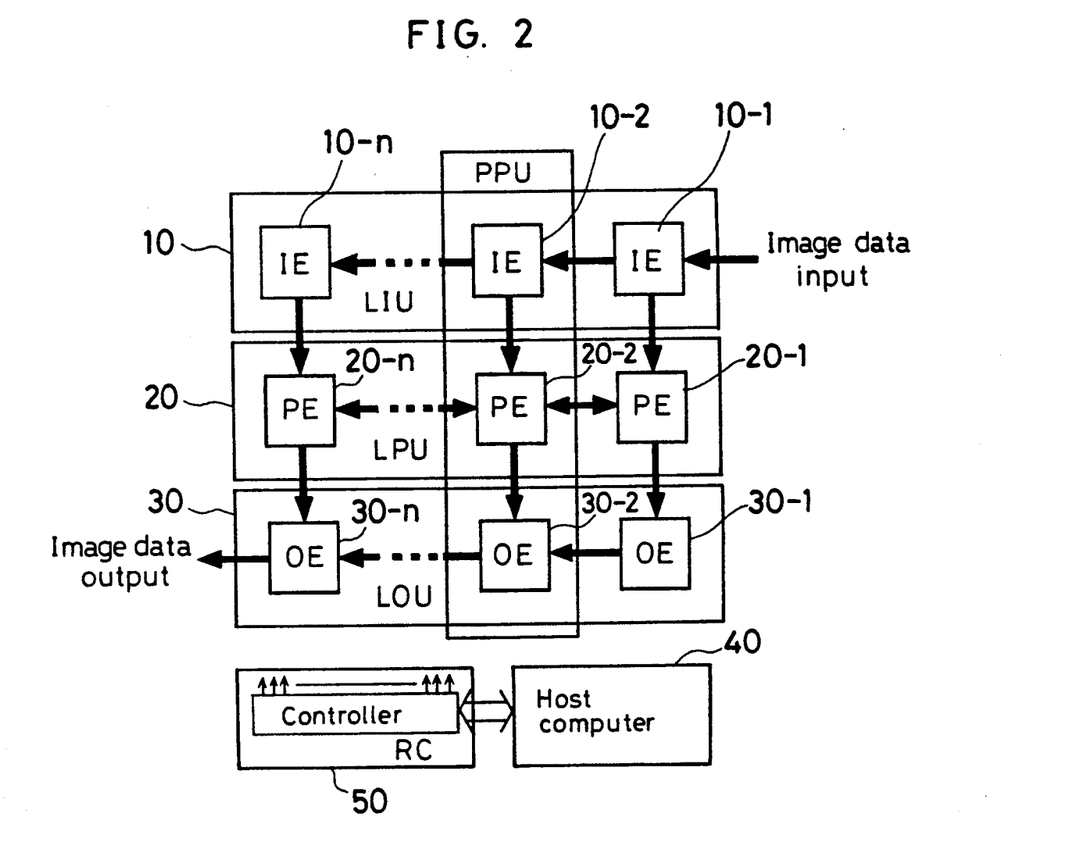
FIG. 2 is a drawing for explaining hardware configuration of an image processing system of the invention.
Figure 3:
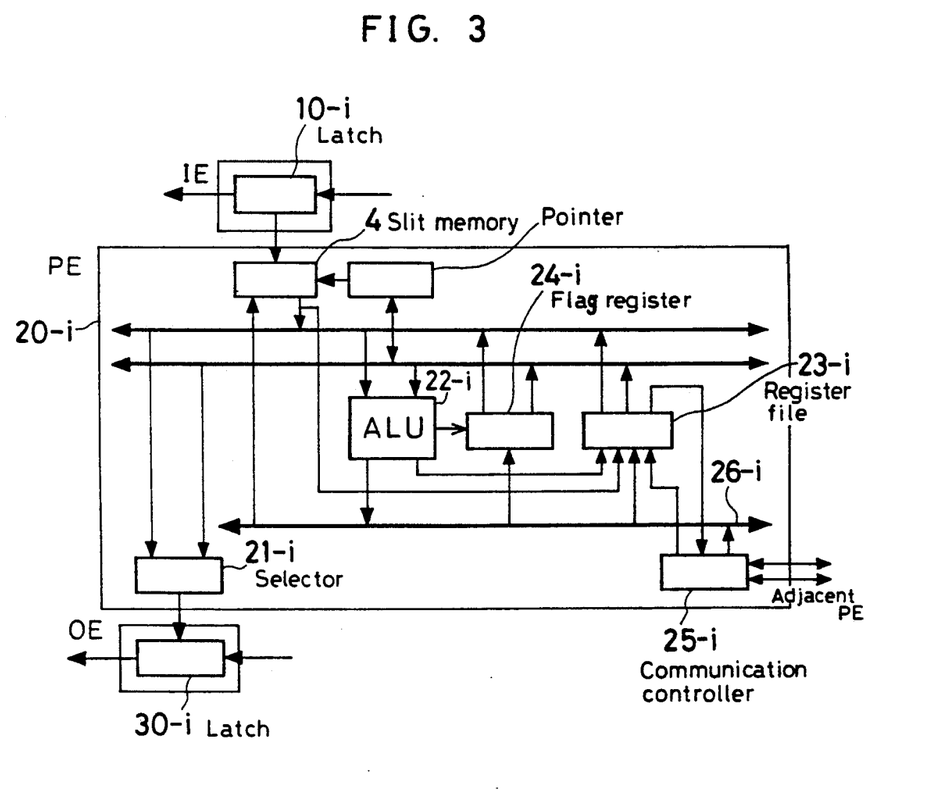
FIG. 3 represents an image processing element.

The hardware configuration of RIPE according to the present invention is as given in FIG. 2, and this system works as a back-end processor of a host system, and it comprises an external controller 50, input units 10, computation units 20, and output units 30. Synchronizing with a host computer 40, the external controller 50 controls the input units 10, the computation units 20 and the output units 30. It has RAM for storing a processing program prepared by a user and ROM where basic processing program is stored, and it sends instructions stored in RAM or ROM in accordance with the instructions from the host computer 40 sequentially to each computation unit 20 by each step, and each computation unit functions as a processing machine to execute only what has been instructed. Prior to the processing, the processing program prepared by the user is down-loaded to RAM of the controller 50 from the host computer 40.

LIU 10 which is in charge of the input stage comprises "n" latch circuits (IE) of 16-bit width and operates as a shift register. Image data stored in the other memory or image data read by a camera is inputted in the order of raster scan, shifting each pixel data. When all pixel data for a line of the image are obtained, the pixel data for a line are simultaneously transferred in parallel to each of PEs 20-1 to 20-n of LPU 20.

LPU 20 comprises "n" PEs and is in charge of computation stage. It consists of modules as shown in FIG. 3. FIG. 3 shows an i-th PE, i.e. PE 20-i, which reads the data from a latch circuit 10-i sequentially on a slit memory 4. This data is computed by ALU 22-i through a bus 26-i, and intermediate results are stored in a register 23-i, and the results are outputted to a latch circuit 30-i through a selector 21-i. Each PE receives instructions from the controller 50 by each step and performs the same processing simultaneously. No program is stored in its own memory, and each PE operates simply as a processing machine by an instruction from outside.

Figure 1A:
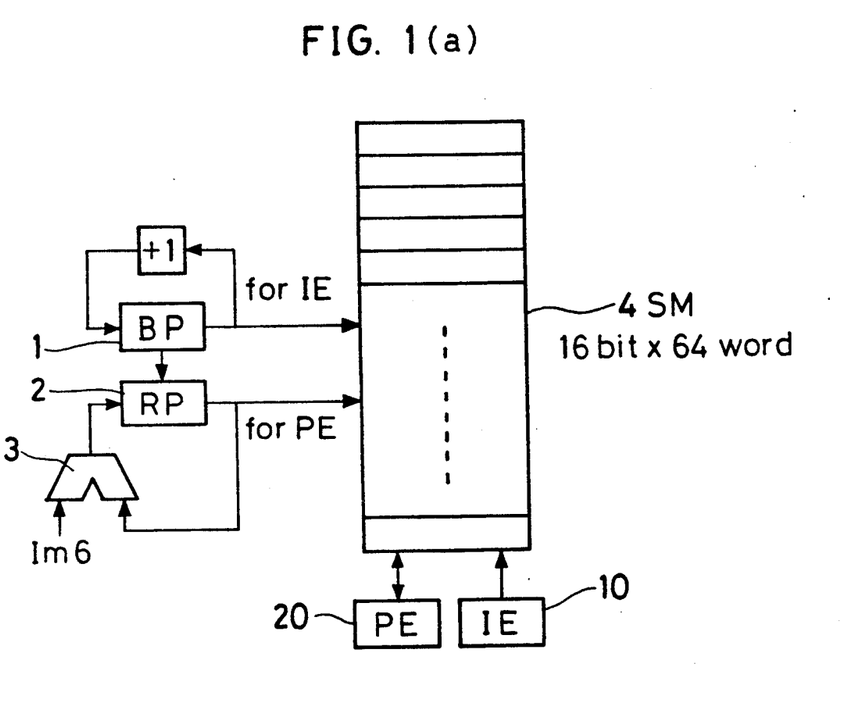
FIG. 1(a) and 1(b) are a schematical drawing for explaining hardware configuration of memory access according to the present invention.
Figure 1B:
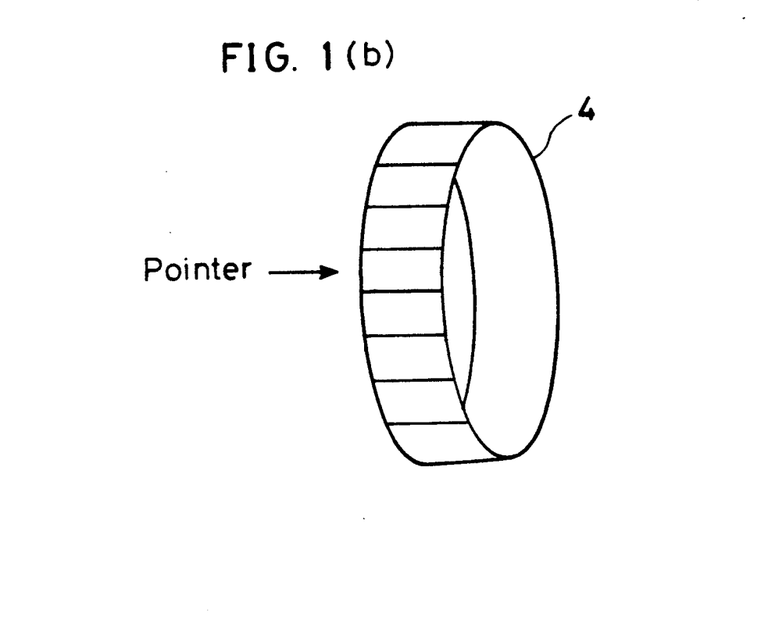

The slit memory 4 possesses an address space with k-bit width as shown in FIG. 1, and it is an endless type memory of finite length ($2^k$) with its top address and the terminal address connected with each other. It is to store the data necessary for the filtering operation. That is, in order to determine the output value of a pixel in local processing for image data, pixel data near such pixel are also required. If it is supposed that each PE has its necessary data in it in this case, the data are overlapped in the entire system, and this is not very economical. To solve this problem, it is designed that the slit memory in each PE stores as much data as necessary of a row, for which the PE is in charge of processing, i.e. each PE stores pixels in longitudinal direction in a mask. The remaining neighboring data are kept in slit memory of the other PEs, and these are obtained by data transfer between the adjacent PEs through a communication controller 25-i. In the present example, each slit memory consists of 64 cells of 16-bit width, and spatial parallel processing using a mask with length of 64 or less in row direction can be achieved.

ALU 22-i is to perform arithmetic logic operation of 16-bit width to each pixel. The content of the processing depends upon which filtering operation is to be performed. ALU 22-i executes the instruction as given one by one from an external controller.

Register file 23-i is a file with a register where data such as intermediate results are stored. It comprises 16 GRs (general registers) of 16-bit width, CRs (communication registers) to store the data transferred between the adjacent PEs through the communication controller 25-i, and so on. Flag register 24-i is to store the contents of flags such as sign, zero, overflow, carry, etc.

When local processing is performed, neighboring data are not completely obtained on outer periphery of the image, and the results of computation become invalid. According to conventional algorithm for image processing, output value is forcibly turned to 0, or an adequate constant or a neighboring value is set depending on the processing content. By a selector 21-i, it is set in such manner that the output value on outer periphery of the image is turned to a constant or computed value is used even though it is invalid.

Each PE reads sequentially the necessary data read on the slit memory 4, receives the data from adjacent processing unit through communication controller. Then, filtering operation is performed, and the data are outputted to the latch circuit.

LOU 30 in FIG. 2 comprises "n" latch circuits of 16-bit width and is in charge of output stage. The data computed by LPU 20 is transferred to LOU 30 for each line at the same time, and are then sequentially shifted so that these data are outputted in the order of raster scan by each pixel.

Figure 4:
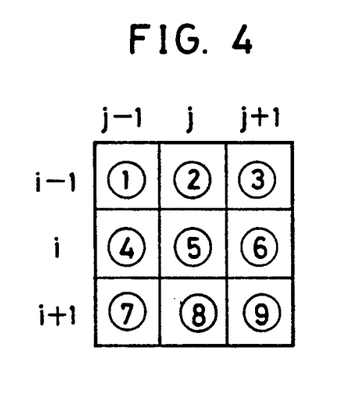
FIG. 4 is a schematical illustration for explaining filtering operation.

In a RIPE system with such arrangement, description is now given to an example of local averaging filter as shown in FIG. 4. When it is supposed that the center of a mask is (i, j), the data in row direction of each pixel are kept in each PE. The addition for the row j is performed by PE 20-j, i.e. the computation (2)+(5)+(8) is performed. Then, the results of addition [(1)+(4)+(7)] of the row (j−1) at PE 20−(j−1) in charge of the row (j−1) are received and added to the results of the addition in the row j. Next, the results of the addition of the row (j+1) at PE 20−(j+1) in charge of the row (j+1) i.e. [(3)+(6)+(9)], are received and are added to the results of the addition in the row j and the row (j−1). Finally, the results are divided by 9, and local averaging is achieved.

Figure 5:
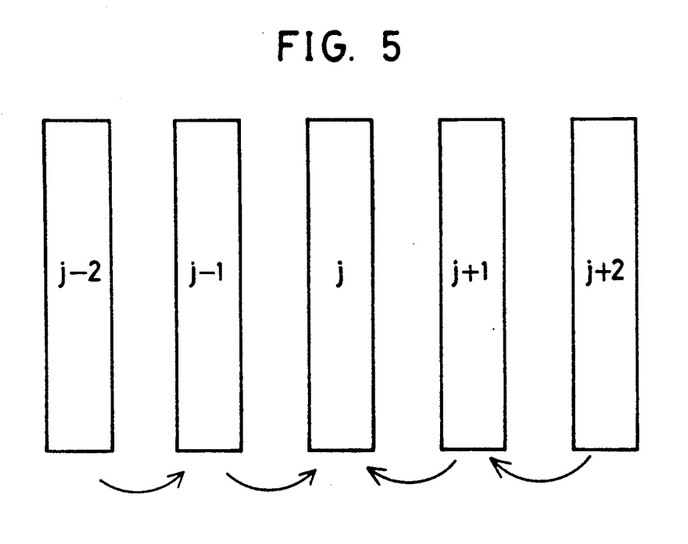
FIG. 5 explains data transfer in the filtering operation.

In this case, if it is supposed that mask size is 5×5, the data of the row next to the adjacent row must be transferred twice as shown in FIG. 5. Specifically, to receive the data from a row next to the adjacent row, it is necessary to transfer twice. However, if the data are transferred to the adjoining row from each row, the data of the row (j−2) and the row (j+2) can be received as the data are received from the data of the row (j−1) and the row (j+1) because the data of the row (j−2) and the row (j+2) are transferred to the adjacent row (j−1) and the row (j+1) and are maintained. Thus, all PEs can obtain the necessary data by simply transferring the data to the PE in the adjacent row.

In such filtering operation, the content is changed one by one sequentially by external controller each time the line changes 50 as shown in FIG. 1 (a), and the content is cleared when it reaches the terminal of the slit memory in the base pointer 1. By such base pointer 1, a base point of the slit memory necessary for filtering operation is specified, and the content of the base pointer is written to a reference pointer at the same time. Depending upon mask size of the filter, the reference pointer 2 writes the content to a memory address register 3 based on the value "n" of the base pointer when the content of the base pointer is "n" in case of a mask of 5×5, for example, and 1 is added to or subtracted from its own value. By performing this procedure sequentially, it is possible to specify the addresses up to n to n+4 (or n−4) automatically, and to read the data. When the value of the base pointer 1 reaches ($2^k - 1$), the value is reset to 0 in case of line feed and returns to the top address. Therefore, the slit memory has a structure of an endless ring as shown in FIG. 1 (b). The content of this base pointer is updated one by one by the controller each time line is changed, and each PE simply executes filtering operation without being aware in which line it is currently processing.

In this way, by a base pointer, whose content is changed sequentially one by one from outside, and by a reference pointer, which uses the value specified by the base pointer as origin and is incremented or decremented each time memory address is specified, the content of the slit memory is read out, and the data necessary for filtering operation is read out by hardware configuration. Thus, it is possible to reduce the processing time to a value more than several times smaller than the time in the processing by software with ordinary memory. The filtering operation according to the present invention can be applied not only to local averaging filter but also to various filters such as Laplacian filter, Gaussian type smoothing filter, median filter, pseudo-median filter, applicational averaging filter, etc.

In the following, description will be given to the other embodiments of the present invention.

LOU 30 in FIG. 2 comprises "n" latch circuits of 16-bit width and is in charge of output stage. The data computed by LPU 20 are transferred to LOU 30 simultaneously by each line, and are sequentially sifted and outputted in the order of raster scan by each pixel.

Figure 6A:
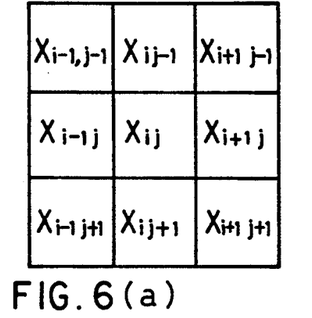
FIGS. 6(a), 6(b), and 6(c) are for explaining filtering operation of the present invention.
Figure 6B:
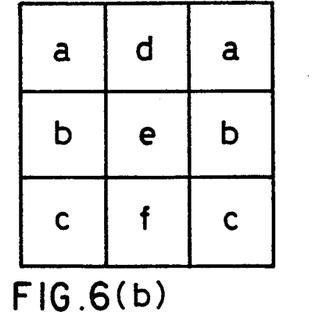

In a RIPE system with such arrangement, let us imagine a case where processing is performed by a left-to-right symmetrical filter of 3×3 as shown in FIG. 6 (b). FIG. 6 (a) shows pixel data of 3×3 having the center (i, j), and it is supposed that the result of the computation performed is a sum of elements of the following matrices obtained from the product for each element of the matrices of FIG. 6 (a) and FIG. 6 (b).

$$\begin{bmatrix} ax_{i-1j-1} & dx_{ij-1} & ax_{i+1j-1} \\ bx_{i-1j} & ex_{ij} & bx_{i+1j} \\ cx_{i-1j+1} & fx_{ij+1} & cx_{i+1j+1} \end{bmatrix}$$

If it is assumed that the processing element of the row "i" for this computation is PEi, PEi reads pixel data from a slit memory, executes computation, and stores the results to a register. This computation is performed as follows:

(1) Multiplication of each weight and pixel data of the row i ($dx_{ij-1}$, $ex_{ij}$, $fx_{ij+1}$)
(2) Addition ($dx_{ij-1}+ex_{ij}+fx_{ij+1}$)
(3) Transfer processing of pixel data of the row (i−1) ($x_{i-1j-1}$, $x_{i-1j}$, $x_{i-1j+1}$)
(4) Multiplication of pixel data and weight in the row (i−1) and addition of the results of multiplication ($ax_{i-1j-1}+bx_{i-1j}+cx_{i-1j+1}$)
(5) Addition [(2)+(4)]
(6) Transfer of pixel data in the row (i+1) ($x_{i+1j-1}$, $x_{i+1j}$, $x_{i+1j+1}$)
(7) Multiplication of pixel data and weight in the row (i+1) and addition of the results of multiplication ($ax_{i+1j-1}+bx_{i+1j}+cx_{i+1j+1}$)
(8) Addition [(5)+(7)]

The number of multiplications in this computation is: $3\times3=9$. The number of addition is 8, and the number of transfers is 6. In case mask size is $M\times M$, the number of multiplication is $M^2$, and the number of additions is $M^2-1$. The number of transfers is $(M-1)$. The increase of M means that more processing time is required.

Based on the fact the weight of filter is symmetrical (left to right), it is aimed according to the present invention to reduce the share of processing by each PEi.

Figure 6C:
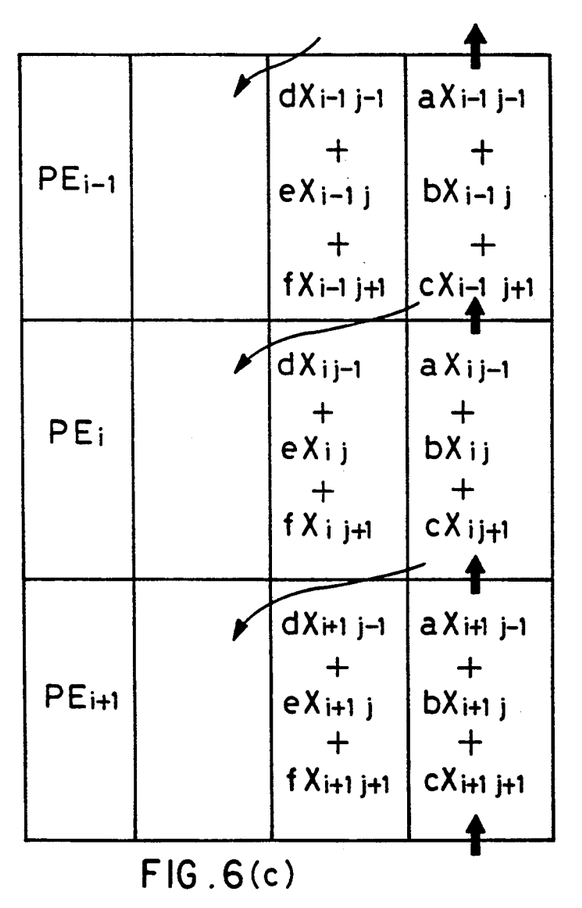

As shown in FIG. 6 (c), a processing element PEi-1 reads pixel data of a row under charge of processing from a slit memory. It is further multiplied by weights d, e and f respectively and the results are added. The pixel data of the same row is multiplied by weights a, b and c and similar addition is performed, and the results of the computation:

$$dx_{i-1j-1}+ex_{i-1j}+fx_{i-1j+1}$$

$$ax_{i-1j-1}+bx_{i-1j}+cx_{i-1j+1}$$

are stored to registers respectively.

The processing element PEi reads pixel data of a row under charge of processing from a slit memory. The data is multiplied by weights d, e and f respectively and the results are added. The pixel data of the same row is multiplied by weights a, b and c and the results are added, and the results of the computation:

$$dx_{ij-1}+ex_{ij}+fx_{ij+1}$$

$$ax_{ij-1}+bx_{ij}+cx_{ij+1}$$

are stored to registers.

Processing element PEi+1 reads pixel data of a row under charge of processing from a slit memory. The data are multiplied by weights d, e and f, and the results are added. The pixel data of the same row are multiplied by weights a, b and c and the results are added, and the results of the computation:

$$dx_{i-1j-1}+ex_{i-1j}+fx_{i-1j+1}$$

$$ax_{i-1j-1}+bx_{i-1j}+cx_{i-1j+1}$$

are stored to registers.

In this way, the processing element of each row multiplies each pixel data of a row, for which it is in charge, by weights of a row at the center of the filter. It also multiplies by weights of the row on one side of the central row of the filter and the results are added. In the computation by each processing element, pixel data of the row are multiplied by weights a, b and c, and the resultant data are transferred from the adjacent row, and computation is performed. For example, in the processing element PEi of FIG. 6 (c), the results of the computation:

$$ax_{i-1j-1}+bx_{i-1j}+cx_{i-1j+1}$$

are received from the adjacent PEi−1 as shown in an arrow, and the results of computation:

$$ax_{ij-1}+bx_{ij}+cx_{ij+1}$$

are received from the adjacent PEi+1. Thus, the computation of filter operation can be carried out. As the result, the number of multiplications by the processing element PEi can be reduced to 6. The number of additions can be reduced to 6, and the number of transfers to 2. When this procedure is applied to larger mask size, only the number of rows other than the central row of the filter increases. Thus, the data of a row in charge can be multiplied by weight of each of these rows. When this procedure is applied to the mask size $M\times M$, the number of multiplications is $M(M+1)/2$, the number of additions is $(M-1)(M+3)/2$, and the number of transfers is $(M^2-1)/4$. Thus, the processing time can be reduced.

In case of a Laplacian filter, which is a specific symmetrical (left-to-right) example, e.g. in case of a Laplacian filter having weight such as:

| −1 | 2 | −1 |
|---|---|---|
| 2 | −4 | 2 |
| −1 | 2 | −1 | the weight of the center can be obtained by doubling the weight on the right side: −1, 2 and −1. Each processing element PE multiplies each pixel data of the row, for which it is in charge of processing, by weights of −1, 2 and −1 respectively, and the results are added. PE itself multiplies the resultant sum by −2, and the result of the addition is transferred to the adjacent row. This makes it possible to reduce the number of multiplications and the number of additions. In case the mask size is $M\times M$, it is possible to reduce the number of multiplications $M^2$ to $(M+1)$, the number of additions $M^2-1$ to $2(M-1)$, and the number of transfers $M(M-1)$ to $4M/3-2$.

Further, in case the weights of mask in FIG. 6 (b) are all the same, e.g. in case they are even such as:

| a | a | a |
|---|---|---|
| a | a | a |
| a | a | a | the procedure described above is applied for the row direction. For the line direction, previous data can be used for 2 lines when displaced by one line. Thus, it is possible to omit computation. In case the mask size is $M\times M$, it is possible to reduce the number of additions $(M^2-1)$ to $2(M-1)$, and the number of transfers $M(M-1)$ to $(M-1)$. As the result, the number of transfers is $M(M-1)$.

Figure 7:
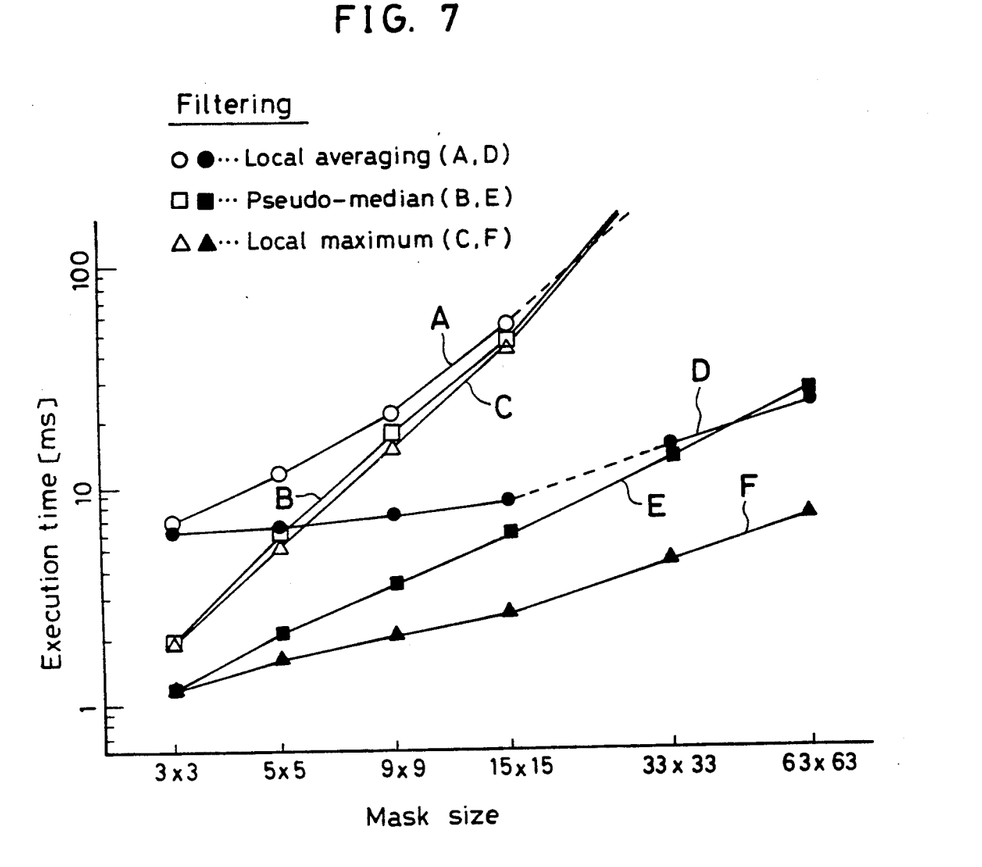
FIG. 7 is for explaining the relationship between mask size and execution time.

FIG. 7 shows the relationship between mask size and filtering operation time when the present invention is applied to local averaging, pseudo-median, and local maximum filters.

The characteristics A, B and C are by the conventional method, and D, E and F are by the present invention. For example, in case of a local maximum filter and mask size of 63×63, internal processing time by the conventional method is 837.35 ms, while the processing time in the present invention is 7.68 ms, being shortened to about 1%, and this is suitable for very high-speed processing.

As described above, it is possible according to the present embodiment that the processing element corresponding to each row can multiply pixel data of the row, for which it is in charge, by weight of the central row of filter and the results are added, and the pixel data of the row, for which it is in charge, is multiplied by weights of the row on one side of the central row of the filter and the results are added, and the results of the computation are transferred by processing element of each row. Thus, it is possible to reduce the number of multiplications, the number of additions and the number of transfers, and the filtering operation time can be extensively shortened.

Figure 8:
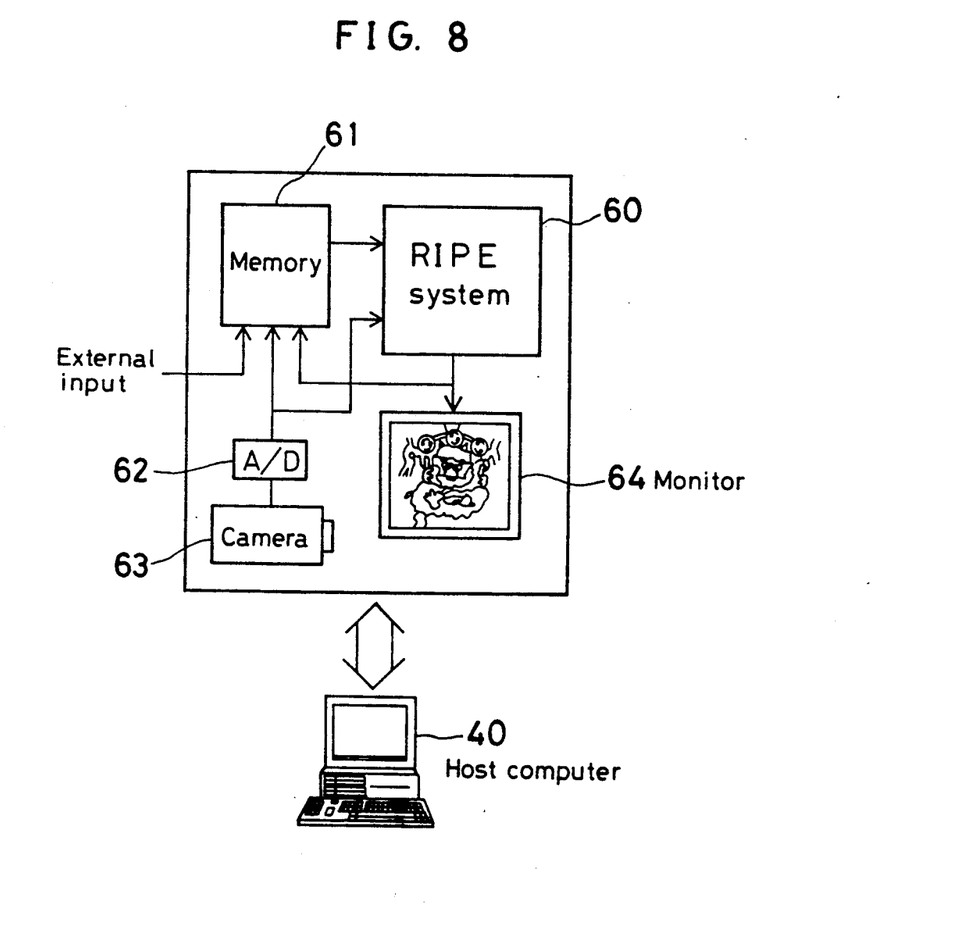
FIG. 8 is to explain a RIPE system.

In the image processing of the present invention as described above, image data directly read by a camera 63 may be processed by A/D conversion and may be read directly on a RIPE system 60, or the data read in a memory 61 once is read out and is read in the RIPE system, or either of these procedures may be followed. The results can be outputted to a monitor 64 or the results may be written to the memory 61 again by the instruction from a host computer 40.

In the above embodiment, description has been given on a case where PE is prepared for pixels in a line of an image and image processing for a line is executed simultaneously in parallel, whereas the present invention is not limited to this. Even in case PE does not satisfy pixels for a line of the image, it is possible that PE can follow the procedure by partially overlapping sequentially. In this case, the degree of overlapping can be changed according to mask size of the filter.

What we claim is:

1. A filtering system for very high-speed image processing performing image processing in parallel for each unit sequentially in each line, comprising:
    an input unit having a plurality of input elements for taking up all or a part of image data of each line in the order of raster scan;
    a processing unit having a plurality of processing elements for performing image processing computation in parallel for each pixel as image data from each input element is transferred simultaneously;
    an output unit having a plurality of output elements where processing data from each processing element is simultaneously transferred; and
    a controller for controlling the input unit, the processing unit, and the output unit;
    each processing element comprising an endless memory having memory capacity for storing as much data as required of a row in charge of processing and having a terminal address connected to a top address, a base pointer for writing the top address next to the terminal address such that each content is changed for each line by a command from said controller, and a reference pointer for writing the content of the base pointer for each line and for specifying an address of said memory by changing each content of the data read from the endless memory, whereby a region of the endless memory corresponding to a mask size of the filter is sequentially accessed by the reference pointer.

2. A filtering system for very high-speed image processing performing image processing by a weighted filter having left-to-right symmetry locally and in parallel for each pixel sequentially in each line, comprising:
    an input unit having a plurality of input elements for taking up all or part of image data of each line in the order of raster scan;
    a processing unit having a plurality of processing elements for performing image processing computation in parallel for each pixel whereby image data form each input element is transferred simultaneously from each input element;
    an output unit having a plurality of output elements where processing data from each processing element are simultaneously transferred;
    a controller for controlling the input unit, the processing unit, and the output unit;
    each of said plurality of processing elements including means for multiplying each pixel data of the row, for which it is in charge of processing, by a weight of each row at a center of said weighted filter, means for adding together and maintaining the results of multiplication of each pixel data of the row by the weight of each row at the center of said weighted filter for multiplying each pixel data of the row for which it is in charge of processing by a weight of other rows on one side of a central row of said weighted filter, and for adding together and maintaining the results of the multiplication by the weight of other rows on one side of the central row of said weighted filter, and wherein each of said plurality of processing elements executes a filtering operation by receiving the transferred data maintained by the processing element of the other rows.

* * * * *